United States Patent Office 3,269,613
Patented August 30, 1966

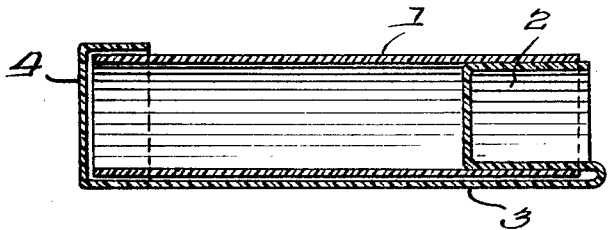
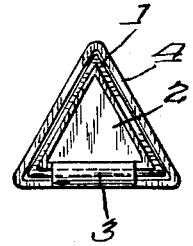
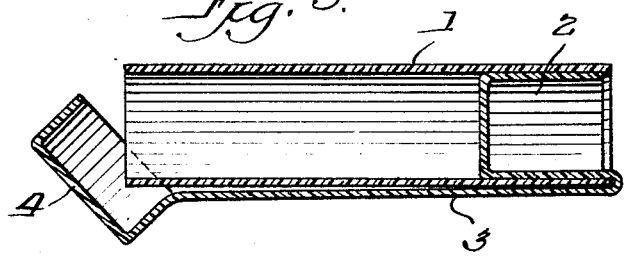
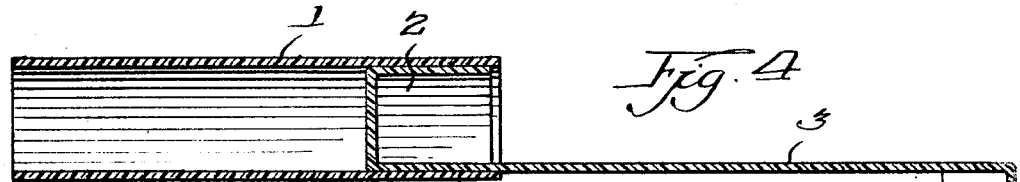
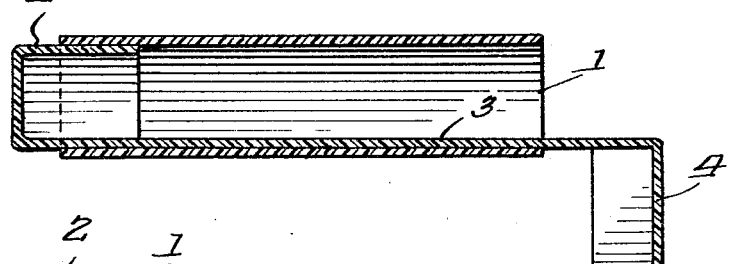
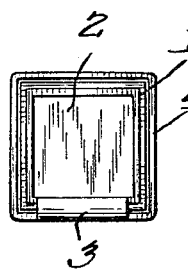

3,269,613
DISPOSABLE DISPENSING CONTAINER
Georgene Nickas, 3046 N. Francisco Ave., Chicago, Ill.
Filed Feb. 24, 1965, Ser. No. 434,907
3 Claims. (Cl. 222—392)

This invention relates to improvements in contents dispensing receptacles, more particularly to a receptacle for containing pre-measured quantities of soft or semi-solid matters, as for example, creams and pastes, having for an object to provide a receptacle in or by which a single or pre-determined usage amount of such matters will be contained, effectively preserved, and when desired, readily and completely dispensed therefrom without waste and/or contamination.

It is also an object of the invention to provide a dispensing receptacle in which products will be packaged for commercial trading by either person-to-person, vending machine, or other sales methods, the said products when so contained being maintained in sterile condition, and because of the single usage packaged amount thereof and the disposable character of the receptacle, will avoid those unsanitary conditions incident to repeated usage, plus waste.

A further object of the invention is to provide a receptacle of the stated character so constructed as to afford and assure superior sanitation of and to products contained by and to be dispensed thereby, and by reason of the single use pre-measured quantity therewithin, affording considerable convenience and economy in handling and using, in that they can and will be entirely and quickly expelled in the recommended and prescribed amount for such use, whereupon the emptied receptacle may be disposed of.

Another object of the invention is to provide a disposable dispensing package or receptacle capable of being mass produced in quantity at low cost, as an article of manufacture, including the container, a manually operable contents expeller, and closure components, the latter two being of one piece or integral construction, and all being capable of rapid and economical assembly and content loading.

The foregoing, as well as other objects, advantages and meritorious teachings of my invention will be in part obvious and in part pointed out in the following detailed disclosure thereof, when taken in conjunction with the accompanying drawings, it being understood that the forms of the invention presented herein are precise and what are now considered to be the best modes of embodying its principles, but that other modifications and changes may be made in specific embodiments without departing from its essential features.

In the drawings:

FIGURE 1 is a longitudinal section through my dispensing receptacle wherein it is in its closed and contents containing position;

FIGURE 2 is an end elevation thereof;

FIGURE 3 is a view corresponding to FIGURE 1, except that the receptacle closure cap is shown removed from the adjacent end of the container;

FIGURE 4 is a longitudinal section through the receptacle in which the closure cap and expeller or plunger bar have been swung outwardly and away from the container with the bar in substantial parallel and longitudinal relation thereto preparatory to effecting a contents dispensing operation.

FIGURE 5 is a like section, but wherein the plunger head and its bar have been moved inwardly and through the container to a fully contents discharged or dispensed position; and FIGURE 6 is an end view of a modified form of the dispensing container in which it is of rectangular cross-sectional shape, rather than triangular.

Referring in detail to the drawings, particularly to the form of the invention shown by the FIGS. 1–5, it comprises a sleeve-like container of triangular cross-sectional shape, preferably but not necessarily made of a suitable molded or otherwise formed plastic material indicated by the reference numeral 1. The size of the container will be varied according to the particularly desired capacity thereof. As for example, if the receptacle is to be used for packaging a paste dentifrice, its capacity or size will be such that but a single brushing usage amount will be provided thereby, whereas if it is to be used for packaging a cosmetic, shampoo, shaving or other kind of cream, or semi-solid product (non-edible or edible), its size and capacity will be sufficient to contain a pre-measured single application or use amount thereof.

A plunger head 2 of shape and size substantially corresponding to that of the container interior is snugly and slidably received therein, being normally positioned adjacent one of its open ends (see FIGURES 1 and 3). The outer end of one side thereof is formed or otherwise provided with a flexible or pliable longitudinally extending bar (plunger bar) 3, carrying a closure cap 4 on its free and outer end, whose shape and size is such that it can and will be cappingly and snugly engaged, at times, over the remaining open end of the container, as shown in FIGURE 1 of the drawings. The overall length of the bar and cap, it will be noted, is slightly greater than that of the container whereby, with reverse bending or flexing of the bar at its point of jointure with the plunger head side, it will lie flatly against and longitudinally of and along the adjacent side of the container with the closure cap 4 engaged, or engageable, over said remaining open end.

The plunger head 2 and bar 3 are preferably molded or otherwise formed of plastic or other suitable material such as preference and/or manufacturing economies and conditions may dictate.

Because of the greater overall length of the plunger head and plunger bar, as shown in FIGURES 1, 3 and 4, it will be seen that the cap can be adapted to a position where it can be readily engaged over the container remaining open end; also, that by slight inward sliding of the head and bar, said cap can be flexed outwardly at its point of jointure with the bar and swung freely outwardly for removal from the adjacent or remaining container open end (see FIGURE 3), whereupon the plunger bar can be freely moved to a position parallel to and longitudinally of the container 1 as shown in FIGURE 4. When in such position, the bar and plunger head may be thrust inwardly, causing the latter to move through, and throughout, the length of the container, as shown in FIGURE 5 and fully expel or dispense its previously supplied contents therefrom.

The receptacle, following dispensing of its contents, is disposed of.

Whereas I have shown in the hereinbefore described embodiment of the invention the container plunger head, plunger bar and closure cap to be of triangular cross-sectional shape, it will be understood that other and different cross-sectional shapes may be as advantageously used, i.e., rectangular, as shown in the modified form of FIGURE 6—square, polygonal, etc.

Moreover, it will be understood that while I have hereinbefore described my improved dispensing receptacle as being used for containing a single usage quantity of a dispensable product, its size may be increased, as required, without in any manner whatsoever departing from the spirit of the invention.

A dispensing receptacle constructed in accordance with the invention affords many-fold advantages and benefits, amongst which there may be noted the following:

(1) The receptacle, following dispensing of its contents, is disposable.

(2) Its contents are pre-measured according to the recommended usage quantity thereof. Thus, waste is eliminated.

(3) Being pre-measured, excessive or needless usage of a contained product is avoided, though by the same token, a sufficient amount thereof is provided.

(4) The receptacle contents, once packaged, are maintained in sanitary and sterile condition, especially since only a one-time use amount thereof is contained thereby, and when once opened the contents are wholly dispensed and the container disposed of.

(5) Unlike a receptacle containing a multi-use amount of a product, as for example, a flexible tube, my improved and disposable receptacle is used by but one person, and following use, is discarded.

(6) The receptacle is highly advantageous for use in packaging products sold by or from coin-controlled vending machines, such as are found in public places.

(7) The size of the receptacle is such that it may be conveniently carried in space restricted places, as for example, a pocket, purse, etc.

(8) The receptacle may be used for economically and satisfactorily packaging dentifrice, shaving creams, shampoos, edible creams, jellies or pastes, etc., and (9) Its method of use is convenient, economical, simple and positive.

I claim:

1. A dispensing receptacle, comprising:
    (a) an open ended sleeve-like container;
    (b) a plunger head of cross-sectional shape conforming to that of the container snugly and slidably received within the same and normally positioned adjacent one of its open ends;
    (c) a substantially stiff though pliable bar connected to the plunger head extended longitudinally of said container;
    (d) a closure cap having flanges of cross-sectional shape conforming to that of the container connected to the free end of said bar engageable, at times, over the remaining end of the container, and
    (e) the combined length of the plunger head, the bar, and the closure cap being greater than the length of the container.

2. A dispensing receptacle comprising:
    (a) an open ended sleeve-like container; and
    (b) a one-piece member consisting of a substantially stiff though pliable strip disposed longitudinally of the container, a plunger head of cross-sectional shape conforming to that of the container slidably and snugly received within the same and a closure cap of cross-sectional shape conforming to that of the container engageable at times over one end thereof, said plunger head and closure cap being, respectively, connected to the opposite ends of said strip, and the combined length of the strip, plunger head and closure cap being greater than that of the container.

3. The receptacle of claim 2 wherein said cap has a flange encompassing the end of said container, said strip being an extension of said flange.

References Cited by the Examiner

UNITED STATES PATENTS

| 2,402,072 | 6/1946 | Nehrke | 222—392 X |
| 2,972,407 | 2/1961 | Taylor | 222—386 X |

FOREIGN PATENTS

| 596,900 | 7/1932 | Germany. |

ROBERT B. REEVES, *Primary Examiner.*

HADD S. LANE, *Examiner.*